March 20, 1934.  W. P. KELLETT  1,951,983
LAMINATED BOARD
Filed Dec. 24, 1931

Inventor.
William Platts Kellett.
by [signature]
Atty.

Patented Mar. 20, 1934

1,951,983

UNITED STATES PATENT OFFICE 1,951,983

LAMINATED BOARD

William Platts Kellett, New York, N. Y., assignor to William Platts Kellett, Jr., New York, N. Y.

Application December 24, 1931, Serial No. 582,939

6 Claims. (Cl. 20—91)

The principal objects of this invention are to provide a laminated board structure which will be practically impervious to moisture and the consequent problems arising from the absorption of moisture by wood structures, and which will present extraordinary resistance to thermal conductivity.

The principal feature of the invention consists in incorporating metal foil into a laminated wood structure so as to present resistance to the absorption of moisture and to the passage of heat waves through the structure.

Figure 1:
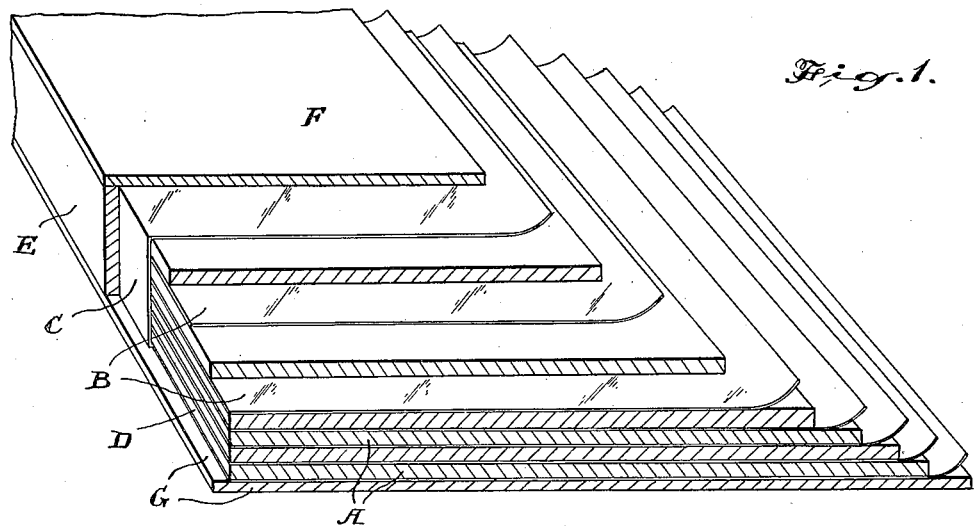

In the accompanying drawing, Figure 1 is a sectional perspective view of a piece of a board constructed according to this invention, illustrating the manner of fabricating same.

Figure 2:
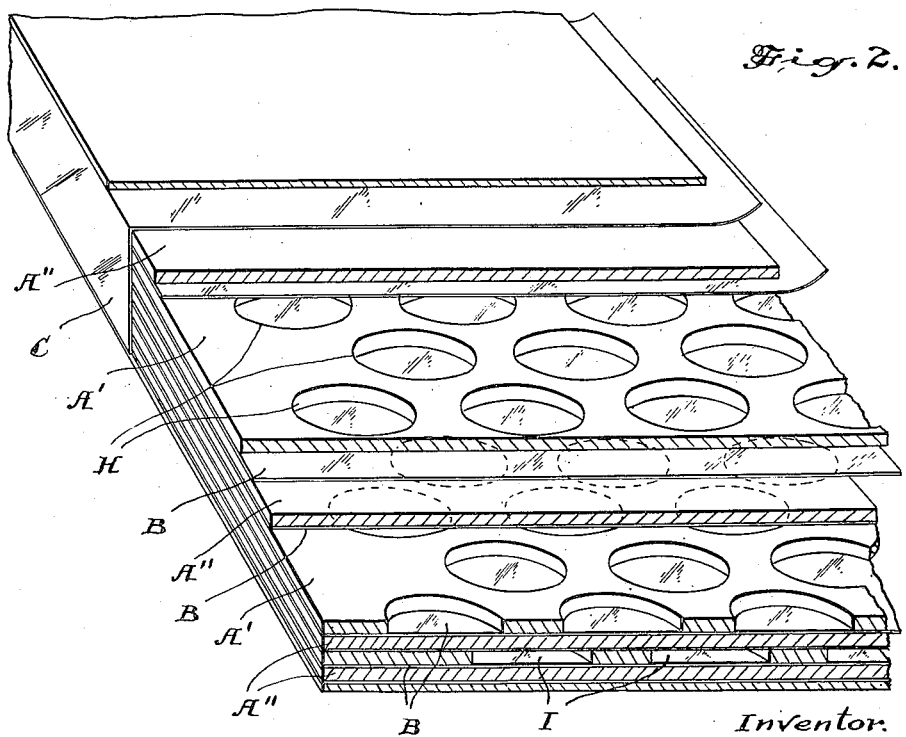

Figure 2 is a view similar to Figure 1 showing a modified construction.

The practice of building up of wood structures from a plurality of thin plies of wood is a very old art and recent development in this art has produced boards of very great strength, formed of quite a number of thin laminations or plies of wood placed together with the grain in opposing relation. The difficulties of the securing of these layers has been overcome in a marked degree by the development of certain forms of adhesives but wood fibres are still susceptible to the absorption of moisture and when absorption occurs swelling and distortion are very positive results.

The present invention positively eliminates this difficulty in a very simple and effective manner and it consists in placing between the several plies of wood A the sheets B of thin bright metal foil, which may be of aluminum, tin, or other suitable material.

The sufaces of the wood are coated with an adhesive which is not only unaffected by moisture but will adhere to the surface of metal foils so that the introduction of the metal foil B between the piles of wood will not detrimentally affect the cohesion of the entire board when complete.

When the inner core, comprising the layers A and foil sheets B, has been completed to the desired thickness, a sheet of foil C is placed around the outer sides of the core to provide a seal for the edges D of the laminations.

A wood strip E is preferably arranged to abut the sheet C covering the edges of the laminations A and cover sheets F and G of suitable quality provide finished surfaces for the composite sheet.

It will be readily understood from this description that the various laminations A are each enclosed by a sheet of metal foil and as such metal foil is impervious to moisture, any moisture being absorbed by the outer covering layers of wood will not penetrate beyond the foils B and C, consequently the main body of the board will remain absolutely dry and in consequence will be free from distortion through the effects of moisture.

In addition to the quality of moisture resistance, the arrangement of the spaced metal sheet having bright metal surfaces effectively prevents the transference of heat waves so that the board forms an excellent heat insulator. This feature is particularly emphasized in the construction illustrated in Figure 2 in which the wood plies A' are perforated with a plurality of openings H. These are preferably arranged in staggered rows as illustrated and it is preferred to arranged unperforated sheets A'' between the perforated sheets and on the outer faces of the composite board.

It is also preferred that the perforations in alternate sheets be staggered in relation to each other. Between the sheets A' and A'' are placed the sheets B of bright metallic foil.

It will be readily seen that in such a construction the orifices H in the perforated boards form sealed chambers I, each of which is lined on the opposite sides with a bright reflective material, so that heat rays penetrating the outer layer or layers of wood and the intervening foil are delivered across the intervening space and are directly reflected back by the reflective surface of the bright metal foil and such waves or rays when turned back are again reflected by the foil surface at the opposite side of the chamber.

It will be readily observed that a constant reciprocating action of the heat rays occurs in each of the cavities or dead-air spaces formed in the body of the structure.

The reflection of these heat rays as described restricts the passage of heat therethrough and it is found that a board of one inch thickness constructed as shown and described will form an almost perfect insulator for ordinary refrigerator construction.

The dual objective of this construction, that is resistance to the transferrence of heat and moisture, render the structure extremely desirable both as a heat and light, as well as moisture insulation. It will be readily understood that the inter-position of a plurality of layers of a bright metal foil will effectively prevent the transference therethrough of light in any form and quite a normal thickness of such material effectively prevents the transition of infra-red rays.

The interposition of the thin foil sheets adds practically nothing to the weight and as the adhesion of the several elements has been fully demonstrated to be not detrimentally affected, the invention lends itself to many branches of commerce in which it will be extremely beneficial, particularly where it is desirable to enclose goods which are detrimentally affected by heat or light rays.

What I claim as my invention is:

1. An improved heat-insulating structure comprising a laminated board formed of a plurality of plies of wood, sheets of bright metal foil arranged between and cemented to said plies of wood, and a bright metal foil covering the edges of said wood plies, whereby a substantially rigid product of high heat-insulating quality is provided.

2. A laminated board formed of a plurality of thin plies of wood placed together face to face, some of said plies having perforations formed therein, and sheets of bright metal foil arranged between said wood plies and presenting highly reflective surfaces at either side of the perforations in said board.

3. A ply wood board formed of a plurality of thin wood plies, alternate plies having perforations cut therethrough forming chambers, and sheets of bright metal foil introduced between the several plies and presenting bright reflective surfaces either side of the enclosed chambers formed by said perforations.

4. A ply wood board formed of an outer ply of wood, a ply of wood having a plurality of perforations therethrough arranged adjacent to the unperforated ply, a sheet of bright metal foil interposed between said plies of wood, a sheet of bright metal foil covering the other face of said perforated sheet and closing the perforations forming a plurality of air-tight chambers, an unperforated wood sheet placed over the aforesaid metal sheet, an outer covering of bright metal foil surrounding said composite structure and forming a moisture and heat insulating casing enclosing said laminated structure, and an outer covering protecting said outer insulating foil.

5. An improved heat-insulating structure comprising a laminated board formed of a plurality of plies of wood, sheets of bright metal foil arranged between and cemented to said plies of wood, a stratum of thin bright metal foil overlying the outer surfaces of the composite structure and forming a heat-reflective sealing enclosure therefor, and a stratum of protective material overlying said reflective sealing enclosure, whereby a substantially rigid product of pronounced heat-insulating character is provided.

6. A laminated board formed of thin plies, of fibrous board rigidly secured together a plurality of which are formed with a multiplicity of recesses therein, and bright metal foil covering said recesses and presenting heat reflective surfaces throughout the structure.

WILLIAM PLATTS KELLETT.